United States Patent [19]

Wilson et al.

[11] 4,256,555
[45] Mar. 17, 1981

[54] ELECTRO-CHEMICAL-MACHINING OF AEROFOIL BLADES

[75] Inventors: John F. Wilson; Brian Towler, both of Bristol, England

[73] Assignee: Rolls Royce Limited, London, England

[21] Appl. No.: 41,396

[22] Filed: May 22, 1979

[30] Foreign Application Priority Data

May 30, 1978 [GB] United Kingdom ............... 24414/78

[51] Int. Cl.³ ........................... B23P 1/02; B23P 1/14; B23P 1/16
[52] U.S. Cl. ............................. 204/129.5; 204/129.7; 204/224 M; 204/225; 204/288; 204/289
[58] Field of Search ............ 204/129.5, 129.6, 224 M, 204/225, 288, 289, 129.1

[56] References Cited

U.S. PATENT DOCUMENTS

| | | | |
|---|---|---|---|
| 3,459,645 | 8/1969 | Wilson et al. | 204/224 M |
| 3,506,558 | 4/1970 | Nagel et al. | 204/224 M X |
| 4,052,284 | 10/1977 | Schrader | 204/224 M |
| 4,100,388 | 7/1978 | Meyer | 204/129.1 X |
| 4,104,503 | 8/1978 | Di Piazza et al. | 204/228 X |

FOREIGN PATENT DOCUMENTS

1065486   4/1967   United Kingdom ............... 204/129.7

Primary Examiner—Howard S. Williams
Assistant Examiner—D. R. Valentine
Attorney, Agent, or Firm—Stevens, Davis, Miller & Mosher

[57] ABSTRACT

An electrode assembly for electro-chemically machining an article, such as an aerofoil shaped blade for a turbo machine. The assembly comprises a plurality of electrodes 2,3 for location adjacent a workpiece 7. Each electrode 2,3 is constrained to move in a first direction towards each other and towards the workpiece 7 and has two side members 22,23 carried by a main body 21. The side members 22,23 are constrained to move with the main body 21 and also relative to the main body in directions parallel to the first direction. The side members 22,23 advance ahead of the main body 21 and when they abut the side members 22,23 of the other electrodes 2,3 their advancement is stopped while the main bodies 21 of the electrodes 2,3, continue to approach each other for a predetermined distance. In this way edge effects during machining are eliminated enabling an accurate shape of article to be produced.

13 Claims, 7 Drawing Figures

ELECTRO-CHEMICAL-MACHINING OF AEROFOIL BLADES

DESCRIPTION

The present invention relates to an electrode assembly for, and a method of, electro-chemical machining an article from a workpiece. The invention has particular, but not exclusive, application to a method of producing aerofoil shaped blades for a turbo-machine.

Aerofoil shaped blades normally comprise an aerofoil portion having curved sides and extending normally from a platform below which is a root portion by means of which the blade is attached to a rotor disc. One difficulty in the production of such blades is the sequence of operations in machining the root, platform, and aerofoil sections.

If the root portion below the platform is machined first, the subsequent machining of the aerofoil has to be very tightly controlled in order to maintain the correct positioning of the aerofoil with respect to the root.

If the aerofoil portion is machined first it is insufficiently strong to be held while machining operations are carried out on the root, and a special process of encapsulation has to be used if the aerofoil is to be held without damage. It is preferably therefore, that the root should be machined first before too many machining operations have been carried out on the aerofoil.

Two alternative processes have been proposed for machining the aerofoil portions of blades electrolytically. Either the electrodes remain static and enclose the workpiece during the machining operation, or the electrodes are movable relatively to the workpiece so that they close together and gradually impose their own shape on the workpiece.

In the first case, because the machining gap between the electrode and the workpiece must not become too large if the efficiency of the process is to be maintained, the process is carried out in several steps with a series of electrodes each a little closer to the finished shape of the article being used. Such a process is described in our U.K. Pat. No. 1,135,571. In order to minimise the number of electrodes required, the workpiece can be preformed to roughly the desired shape before starting the electro-chemical machining process. This however requires additional operations such as extrusion, forging, or casting to produce the appropriate preformed shape, and each of these processes adds to the total cost of the process.

The second alternative process, which involves movable electrodes, has the advantage that the cheapest preforms may be used. However, there are significant difficulties involved in producing the true shape required in the aerofoil, particularly at the leading and trailing edges, because as the electrodes move close together, and the article reaches its final desired shape, field effects start machining the edges of the blade.

It is possible to contour the electrodes at their edges to control the machining effect of the field on the edges of the blade, but the modified shape of the electrodes affects the shape produced in earlier stages of the machining process. It is very difficult to produce an electrode shape which will compromise between the distorted shape produced during the early stages of machining and the field effects in the later stages to produce an acceptable aerofoil shape in the regions of the edges.

If the starting shape of the workpiece is of known geometry it is possible to produce correct edges in the finished blade, without too much difficulty, but if the starting shape is a rough forging for example, when it is extremely difficult if not impossible to correct the electrode to give the correct edge geometry.

Thus, it is almost always necessary to finish the production process with a polishing operation on the leading and trailing edges, which could be a time consuming operation which adds to the cost of the blades.

A further difficulty is that the blade platform which may have been machined to its finished dimensions before the aerofoil is machined has to be masked to prevent stray machining changing its dimensions. Alternatively, if the platform is being machined with the aerofoil, when the electrodes come together a ridge is left on the platform opposite the abutting edges of the electrodes. In either case a further polishing operation has to be under taken to remove the ridge, or to blend the aerofoil and platform surfaces together, and these operations require significant skill and time, thus further adding to the cost of the blade.

The present invention seeks to provide a method and apparatus for electro-chemically machining an aerofoil shaped blade, or other article having side and end surfaces, over the full 360° of its side surfaces, and at the same time to electro-chemically machine the platform, or end surface, to such a degree that on completion of the electro-chemical machining process no further machining or polishing operations are required.

According to the present invention there is provided an electrode assembly for an electro-chemical machining apparatus comprising a plurality of electrodes for location adjacent a workpiece to be machined, each electrode being movable in a first direction relatively towards the workpiece, and each electrode comprising a main body having a machining face shaped to a desired contour and two side members carried by the main body, the side members being constrained to move with the body and also relative to the body in a direction parallel with the first direction of movement of the electrodes, the side members protruding ahead of the machining face of the main body at least during part of the movement of the electrodes in the first direction and means for stopping the movement of the side members in the first direction whilst continuing the movement of the main body in the first direction for a predetermined distance.

The article to be produced may be an aerofoil shaped blade for a turbo machine in which case there are two opposed electrodes for location one on each side of the workpiece, each electrode has a main body the machining face of which is shaped to machine the aerofoil section of the blade, a first side member for machining the trailing edge of the blade, and a second side member for machining the leading edge of the blade, and the electrodes in their final machining position define a cavity which surrounds the aerofoil section of the blade around 360° of the extent of the blade about a longitudinal axis of the blade.

Preferably the side members of each electrode are resiliently urged towards the workpiece and away from the main body of the electrode to define a clearance therebetween, the relative movement between the side members and the main body of the electrode is produced by causing the side members of each electrode to abut the side members of the other electrode or electrodes and thereby stop the advancement of the side members towards the workpiece whilst the main body of the electrode is caused to continue its movement towards the workpiece.

Means may be provided for moving the electrodes relative to the workpiece in a direction with a vector component at an angle to the first direction of movement of the electrodes. Such a means may either move the workpiece itself or comprise apparatus for constraining each electrode to move along a path angled to the first direction so that the electrodes are moved with vector components in the first direction and in a direction angled to the path along which the electrode is moved.

According to a further aspect of the present invention there is provided a method of producing an article by electro-chemically machining a workpiece, the method comprising the steps of:

supporting the workpiece for machining;

locating a plurality of electrodes of an electrode assembly constructed in accordance with the present invention adjacent to the workpiece;

maintaining a gap between the electrodes and the workpiece;

supplying electrolyte to the gap between the electrodes and the workpiece;

applying an electrical potential between the electrodes and the workpiece thereby to electro-chemically machine the workpiece;

causing mutual relative approaching movement between the electrodes and the workpiece to machine the workpiece;

and stopping the relative approaching movement of the side members while continuing the approaching movement of the main body of the electrodes.

Where the article to be produced is an aerofoil shaped blade for a turbo machine, there may be two opposed electrodes located one each side of the workpiece. In this case the main body of each electrode has a machining face shaped to machine the aerofoil section of the blade, a first and second side members are provided for machining respectively the trailing and leading edges of the aerofoil section of the blade, and the movement of the side members of each electrode is stopped by causing them to abut with side members of the opposed electrode.

In the preferred method of using the electrode assembly of the present invention, during the stage in which the electrodes are moving in the first direction, they impose a fairly precise geometry on the workpiece. By the time that the field effects have become significant due to the thinness of the edge of the workpiece, the workpiece is totally enclosed and their machining effect can be predicted. Thus, the cavity defined by the electrodes can be better predicted to produce the final shape of the article.

The invention will now be described by way of an example, in which.

Figure 1:
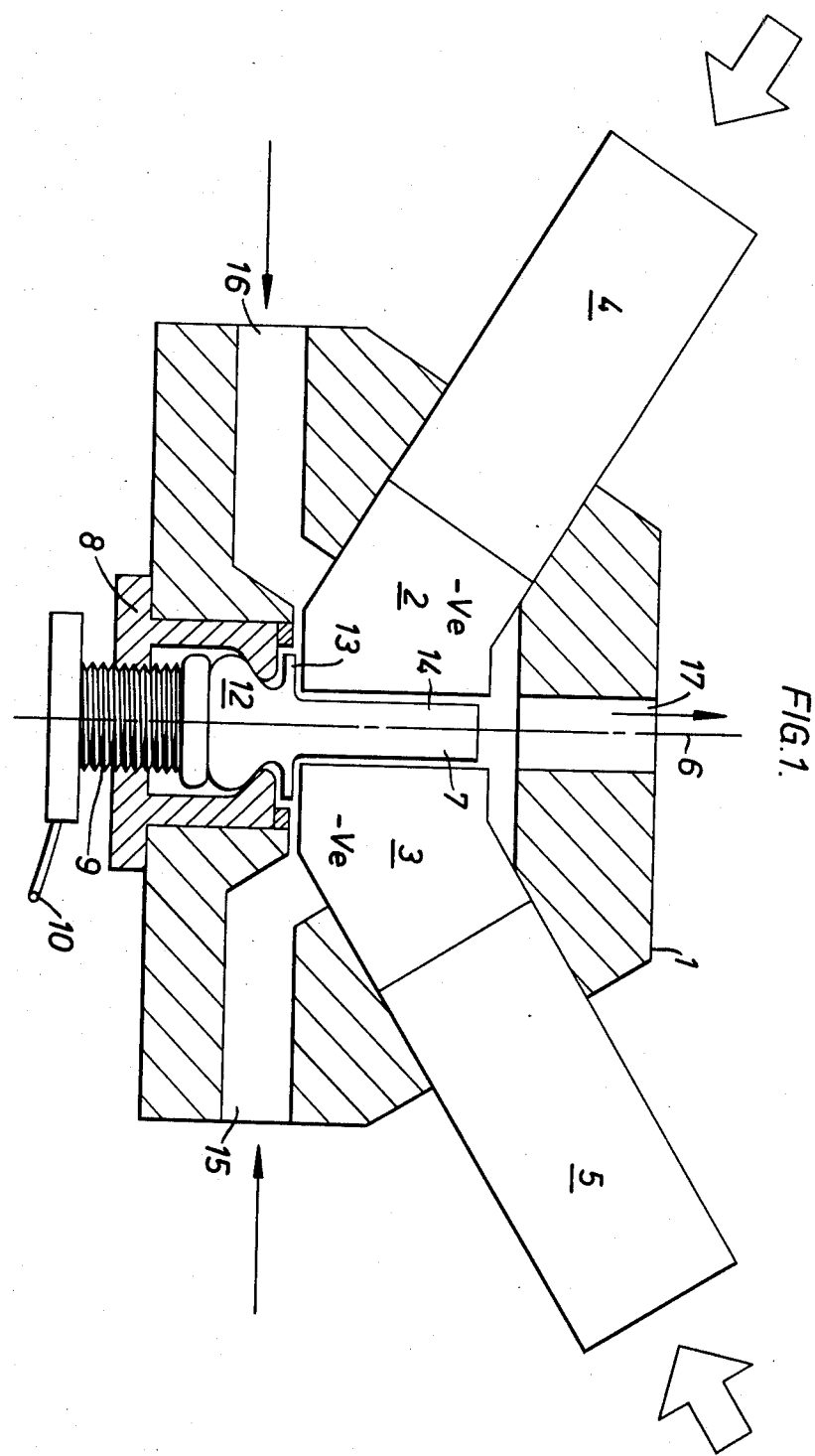
FIG. 1 illustrates an electrode assembly constructed in accordance with the present invention.

Referring now to the drawings there is illustrated in FIG. 1 an electrode assembly for connection to any conventional electro-chemical machining machine. It is to be understood that the present invention relates only to the electrodes and their operation, and that these may be mounted on any known suitable machine, which is not therefore described in any detail. The electrode assembly consists of a housing 1 which is made of insulating material and into which are fitted a pair of electrodes 2 and 3. The electrodes 2,3 are attached to movable arms 4 and 5 respectively, which are to be found on any conventional machine, and the electrodes are constrained towards and away from the workpiece in a first direction normal to the vertical axis 6 of the head by pushing the arms in a direction at 45° to the axis 6.

The workpiece 7 is mounted within a shuttle 8 and is clamped by means of a screw-threaded clamping device 9 so that it is positioned on the vertical axis 6 of the head 1. The clamping device includes an electrical connection 10 which maintains the workpiece at a positive potential relatively to the electrodes 2,3, which are marked as negative. Clearly the clamping device and workpiece may be maintained at a neutral potential and the electrodes maintained at a negative potential.

In the particular embodiment shown the workpiece is a preform of a compressor blade for a gas turbine engine which has a root portion 12, a platform 13 and an aerofoil portion 14. With this embodiment it is convenient to shape the surfaces of the shuttle such that the dovetail root of the aerofoil can be clamped directly against the shuttle.

Passageways are provided for the supply of electrolyte from any conventional source of supply on the machine. The electrolyte enters passageways 15 and 16 at the root end of the workpiece, flows through the space between the workpiece and the electrodes and passes out of the head through passage 17.

Figure 2:
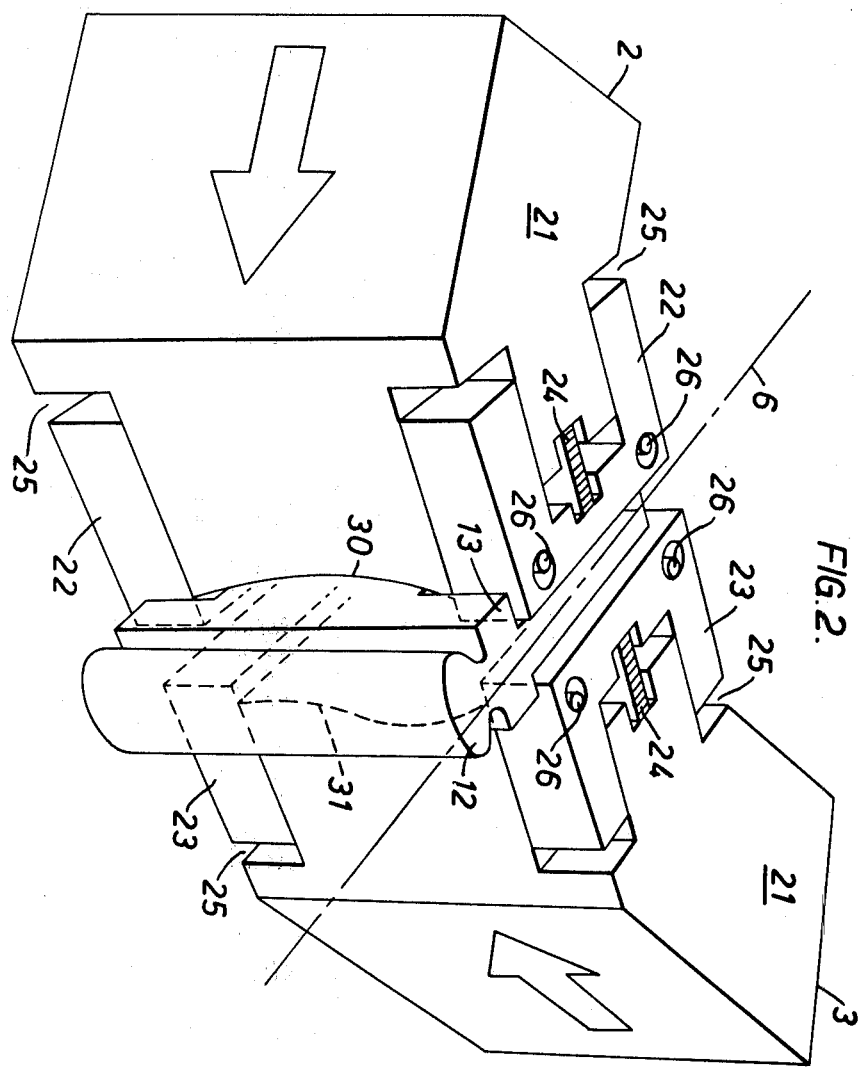
FIG. 2 illustrates the position of the electrode assembly of FIG. 1 during a machining process.

FIG. 2 shows composite electrodes for forming an aerofoil of a compressor blade each having a main body 21, and side members 22,23 which are constrained to move with the main body 21 and to move relative to the main body in a direction towards and away from the workpiece. The side members 22,23 are resiliently urged by rubber blocks 24 away from the main body 21. The clearances 25 between the side members 22,23 and the main body is limited by stops 26.

The workpiece is shown in position during the machining operation at a point during the operation when the electrodes are moving as a whole towards the workpiece by moving them in a direction at 45° to the vertical axis of the machine. The workpiece is positioned so that the axis of the aerofoil part is vertical so that the electrodes 2,3 are moving not only towards each other, and therefore towards the aerofoil part of the workpiece, but are also moving towards the root portion 12 of the workpiece. As the machining progresses the platform 13 begins to be formed simultaneously with the aerofoil. The workpiece is initially of greater width than the finished chord width of the aerofoil. As can be seen from the drawing the main bodies 21 of the electrodes 2,3 have machining surfaces 30,31 respectively which are shaped to produce the aerofoil flanks, and the movable side members 22,23 are arranged to trim the workpiece to approximately the correct chord width.

As the electrodes 2,3 close together, any field effects, due to the machining current which affect the edges of the workpiece, will be affecting only the parts at the edges of the workpiece which are being trimmed off by the side members 22,23. By the time the side members 22,23 abut, the aerofoil flanks will be close to their finished size, and the process becomes one of total area machining of the enclosed aerofoil.

After the side members 22,23 of the electrodes 2,3 have abutted it is necessary to carry on further machining to remove the ridges at the leading and trailing edges of the blade. If this were to be done statically i.e. by allowing the electrodes 2,3 to dwell in this instantaneous position, control would gradually be lost over the machining accuracy, due to the ever-increasing machining gap, while the edge would be machined away relatively quickly by the end effects on their thin sections. Also the radius between the platform and aerofoil surfaces would become unacceptably large.

The final trimming of the blade aerofoil is therefore carried out by continuing the movement of the main bodies 21 of the electrodes relative to the side pieces in a direction towards each other, so that the machining of the flanks is performed for a minimum period at a controlled gap and at an optimum rate, thus maintaining the accuracy of the dimensions of the flanks. The end effects which are operating to rapidly remove the ridges on the leading and trailing edges are thus used beneficially for a short period.

Since control of the machining of a totally enclosed workpiece is more easily predictable, the leading and trailing edges, together with the aerofoil flanks can thus be trimmed down to their final size with high accuracy thus eliminating the need for a final polishing operation.

At the same time, the electrodes are moving as a whole towards the root end of the workpiece and will continue to machine the platform. Sufficient movement towards the platform can be provided to allow enough machining of the platform to remove the ridges left on the platform by the side pieces at the leading and trailing edges of the blade. Since the machining of the platform is proceding simultaneously with the trimming of the aerofoil, at the end of the operation the whole of the blade part of the platform will be finished to the correct size.

Figure 3:
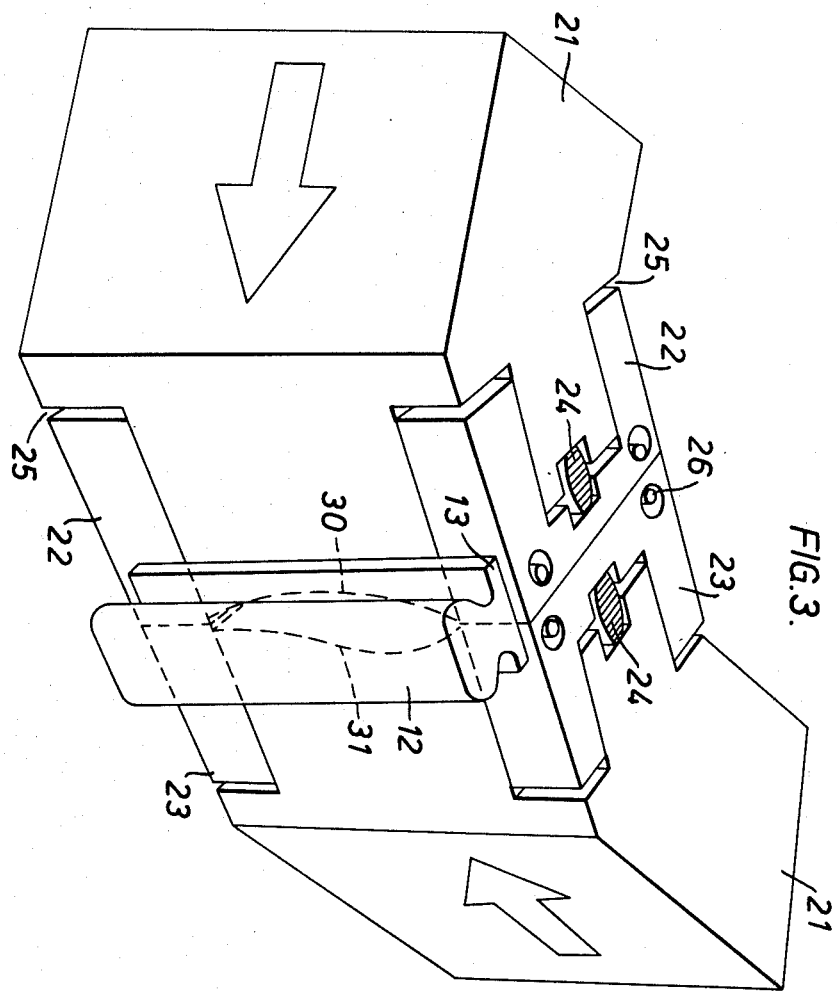
FIG. 3 illustrates the final position of the electrode assembly of FIG. 1 at the end of a machining process.

The relative movement of the electrode and workpiece, for the final trimming of the aerofoil and platform of the blade, is made possible by the mounting of the side members 22,23 for relative movement on the main body of each of the electrodes. As the main body 21 of each of the electrodes continues to move towards each other, with the side members 22,23 in abutment, the clearances 25 between each of the side members 22,23 and the main body 21 are taken up and the resilient rubber blocks are compressed. The final positions of the various parts of the electrodes 2,3 and the workpiece are shown in FIG. 3.

Figure 4:
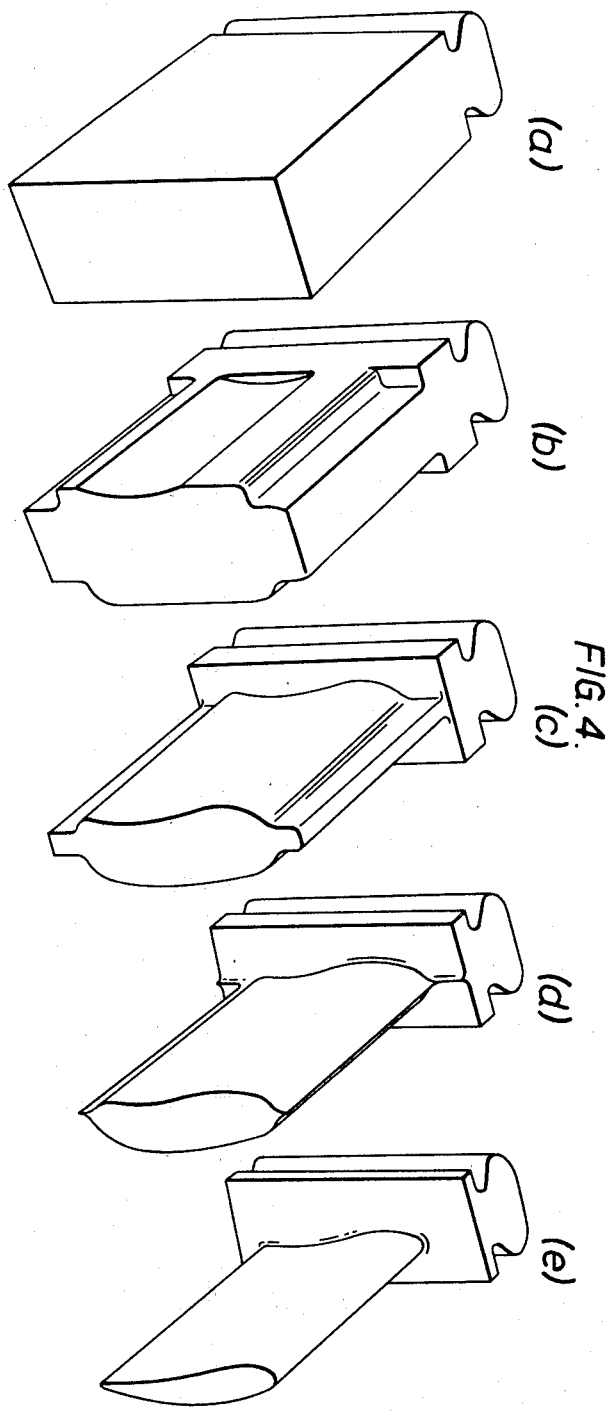
FIG. 4 illustrates in parts (a) to (e) five consecutive stages in the machining of an aerofoil blade for a turbo machine using the electrode assembly of FIG. 1, starting with the workpiece in FIG. 4(a) and finishing with the final blade in FIG. 4(e)

FIG. 4 shows the sequence of events and the intermediate shapes of the workpiece between the starting shape (FIG. 4(a)) and the final finished shape (FIG. 4(b)). FIG. 4(a) shows a rectangular block on which the blade root has already been machined as the starting point for the process, but clearly the initial shape of the workpiece will be decided by a compromise between the cost of the material wasted during electro-chemical machining down to the final aerofoil shape, and the cost of making a pre-form which is closer to the final aerofoil shape. FIG. 4(b) shows the intermediate position where the main bodies of the electrodes are in the positions shown in FIG. 2 and have begun to shape the workpiece. FIG. 4(c) shows a further intermediate shape of the workpiece. FIG. 4(d) shows the intermediate position at which the side members 22,23 of the electrodes have just abutted and have left cusp-shaped projections on both the leading and trailing edge of the aerofoil and on the platform. FIG. 4(e) shows the final shape of the platform and aerofoil after trimming, which is the shape produced with the electrodes in the position shown in FIG. 3.

It is to be noted in FIG. 4 that the size of the root portion is gradually being reduced as the electrodes machine the blade platform during their 45° movement. This relative movement between the electrodes and the platform enables sufficient machining of the platform to be carried out to finish the platform to its final dimensions.

Figure 5:
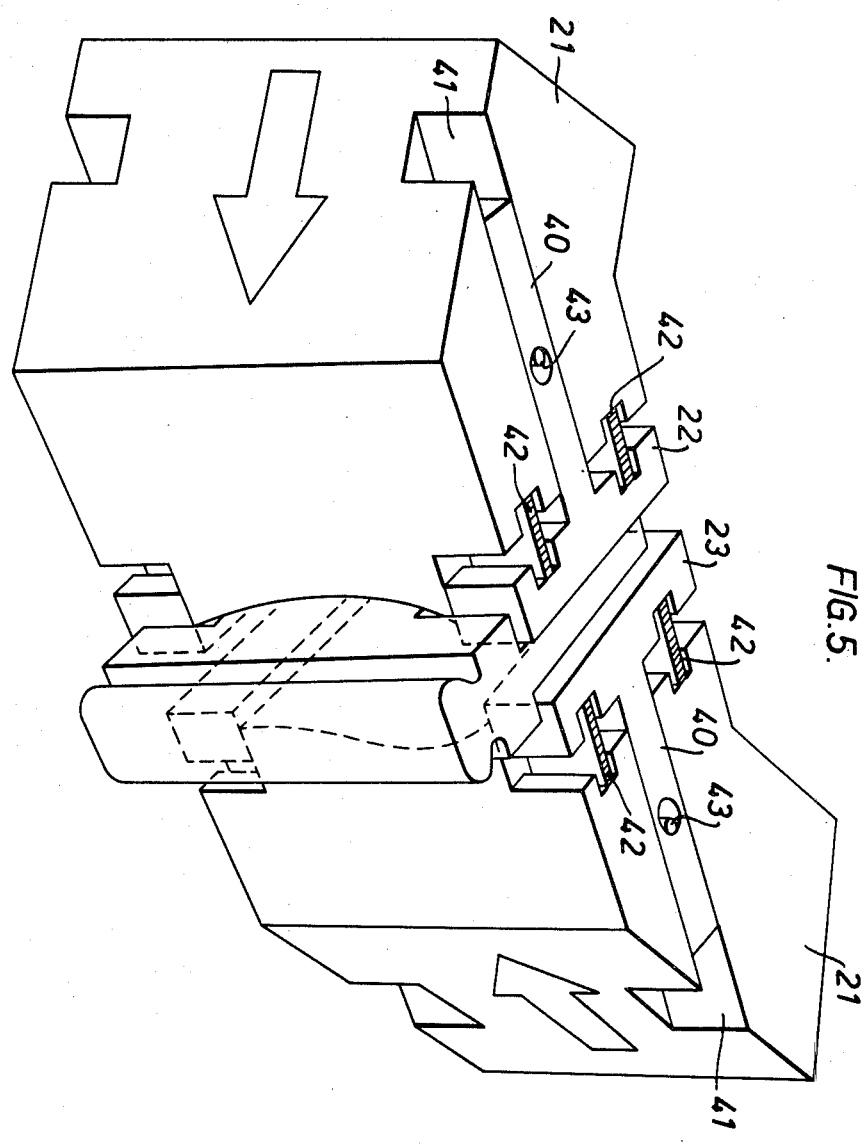
FIG. 5 illustrates a modification of the electrode assembly shown in FIG. 1 constructed in accordance with the present invention.

FIG. 5 shows an alternative electrode assembly in which the movable side members 22,23 are provided with extensions 40 which run in grooves 41 formed on the main bodies 21 of the electrodes, and the resilient rubber blocks 42 are now provided on either side of the extensions. By this means the side members 22,23 can be held square to the main body 21 of the electrodes more accurately. A single stop 43 is provided in each of the channels 41 to limit the movement of the side members 22,23 away from the main body 21.

Clearly other resilient means may be used for urging the side members 22,23 away from the main body 21 of the electrodes 2,3, for example springs.

Figure 6:
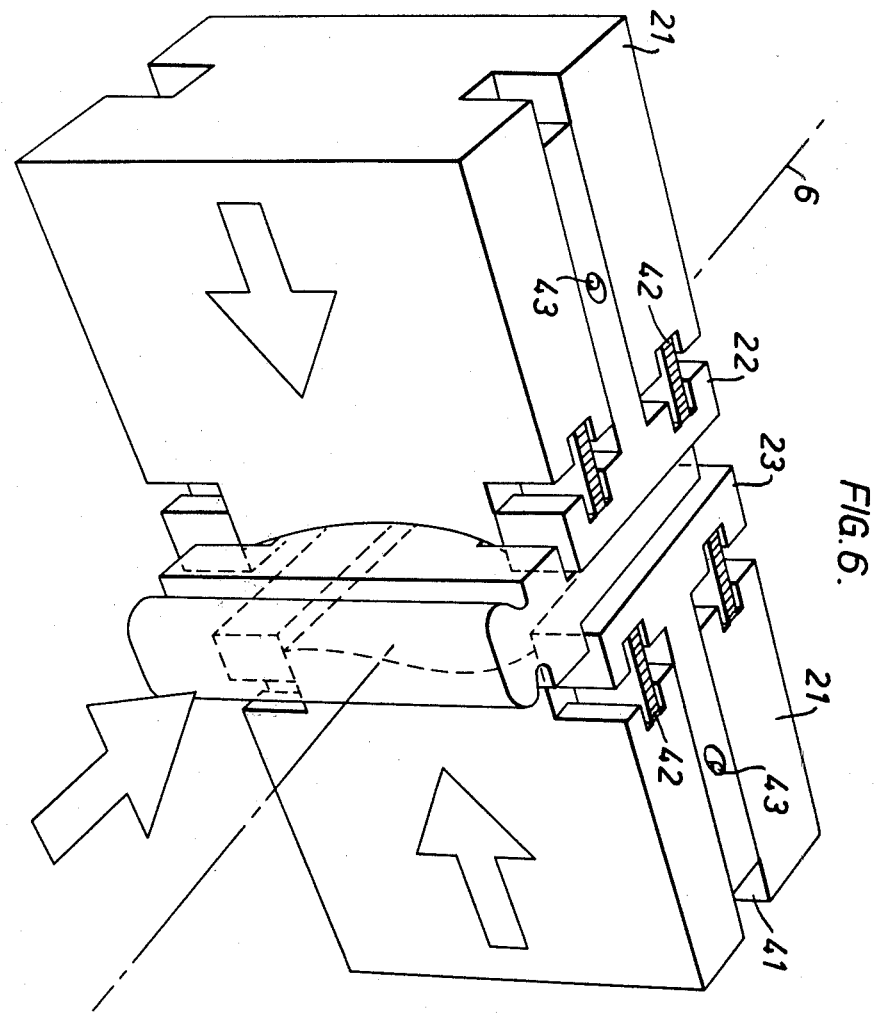
FIG. 6 illustrates an alternative design of electrode assembly to that shown in FIG. 1 constructed in accordance with the present invention.

FIG. 6 shows a further alternative electrode assembly which operate slightly different to the embodiments previously described in that the electrodes are constrained to move only in one direction i.e. perpendicular to the axis of the workpiece, for machining the aerofoil and the leading and trailing edges of the blades, and the relative movement between the electrodes and the workpiece in the direction of the platform is provided by arranging for the workpiece to be movable along its longitudinal axis. The means for providing these movements would be found on conventional machines.

Figure 7:
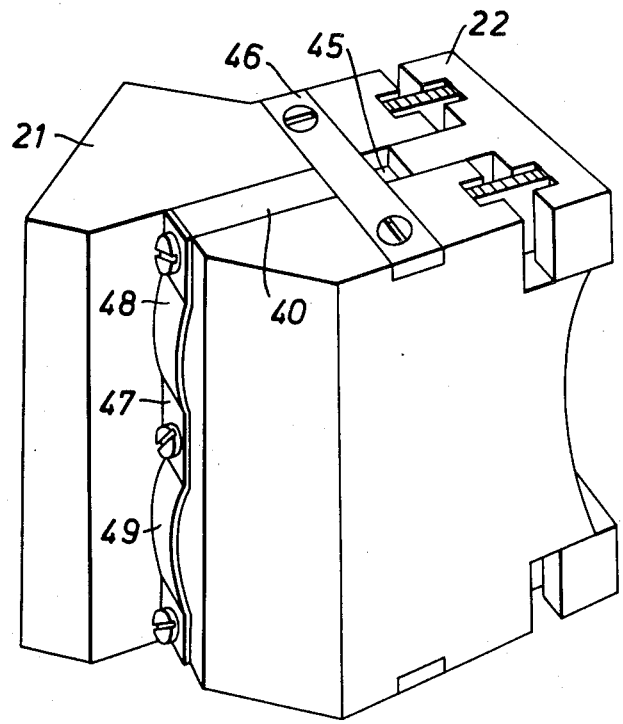
FIG. 7 illustrates one electrode of a further electrode assembly constructed in accordance with the present invention.

FIG. 7 shows yet a further modification to the electrodes of FIG. 5 in which the extension 40 is provided with a channel 45 into which fits a bar 46 to prevent the side members 22,23 from becoming detached from the body 21 of the electrode. The bar 46 also acts as a stop in the same manner as the pins 43 of FIG. 5. A copper strip 47 is attached to the ends of both shanks 40 of the two side members 22,23 to the main body 21 of the electrode 2,3 to maintain the side members 22,23 at the same potential as the main body 21. The strip 47 is flexible and kinked at 48,49, to allow for the relative movements of the side members 22,23 and the main body 21.

As can be seen, the present invention, by solving the problem of completely finishing the aerofoils and platform of a blade in a single electro-chemical machining operation, allows for the cheapest preforms to be used. It also enables the root portions to be machined first while there is still a block of material which has to be machined, and by means of which the workpiece can be gripped to take the force of the root machining operation. Significant advantages in time and cost saving are therefore possible by eliminating the polishing operations previously required on the aerofoils and platform, and the encapsulation operation by means of which the blade was clamped after the aerofoil had been finished in order to machine the root.

We claim:

1. An electrode assembly for an electro-chemical machining apparatus comprising a plurality of electrodes for location adjacent a workpiece to be machined, each electrode being movable in a first direction relatively towards the workpiece, and each electrode comprising a main body having a machining face shaped to a desired contour and two side members carried by the main body, the side members being constrained to move with the body and also relative to the body in a direction parallel with the first direction of movement of the electrodes, the side members protruding ahead of the machining face of the main body at least during part of the movement of the electrodes in the first direction and means for stopping the movement of the side members in the first direction while continuing the movement of the main body in the first direction for a predetermined distance.

2. An electrode assembly according to claim 1 wherein the article to be produced is an aerofoil shaped blade for a turbo-machine and wherein there are two opposed electrodes for location one on each side of the workpiece, each electrode has a main body the machining face of which is shaped to machine the aerofoil section of the blade, a first side member for machining the trailing edge of the blade, and a second side member for machining the leading edge of the blade, and the electrodes in their final machining position define a cavity which surrounds the aerofoil section of the blade around 360° of the extent of the blade about a longitudinal axis of the blade.

3. An electrode assembly according to claim 1 or wherein means are provided for moving the electrodes relative to the workpiece in a direction with a vector component at an angle to the first direction of movement of the electrodes.

4. An electrode assembly according to claim 3 wherein the means comprises a device for moving the workpiece.

5. An electrode assembly according to claim 3 wherein the means comprises apparatus for constraining each electrode to move along a path angled to the first direction so that the electrodes are moved with vector components in the first direction and in a direction angled to the path along which the electrode is moved.

6. An electrode assembly according to claim 1 wherein the side members of each electrode are resiliently urged towards the workpiece and away from the main body of the electrode to define a clearance therebetween, the relative movement between the side members and the main body of the electrode is produced by causing the side members of each electrode to abut the side members of the other electrode or electrodes and thereby stop the advancement of the side members towards the workpiece while the main body of the electrode is caused to continue its movement towards the workpiece.

7. A method of producing an article by electro-chemically machining a workpiece, the method comprising the steps of:

supporting the workpiece for machining;

locating a plurality of electrodes of an electrode assembly adjacent to the workpiece, each electrode being movable in a first direction relatively towards the workpiece, and each electrode comprising a main body having a machining face shaped to a desired contour and two side members carried by the main body, the side members being constrained to move with the body and also relative to the body in a direction parallel with the first direction of movement of the electrodes, the side members protruding ahead of the machining face of the main body;

maintaining a gap between the electrodes and the workpiece;

supplying electrolyte to the gap between the electrodes and the workpiece;

applying an electrical potential between the electrodes and the workpiece thereby to electro-chemically machine the workpiece;

causing mutual relative approaching movement between the electrodes and the workpiece to machine the workpiece;

and stopping the relative approaching movement of the side members while continuing the approaching movement of the main body of the electrodes.

8. A method according to claim 7 producing an aerofoil shaped blade for a turbo machine wherein there are two opposed electrodes located one each side of the workpiece, the main body of each electrode has a machining face shaped to machine the aerofoil section of the blade, a first and second side members are provided for machining respectively the trailing and leading edges of the aerofoil section of the blade, and the movement of the side members of each electrode is stopped by causing them to abut with side members of the opposed electrode.

9. A method according to claim 7, wherein said electrodes are moved relative to the workpiece in a direction with a vector component at an angle to the first direction of movement of the electrodes.

10. A method according to claim 7, wherein the side members of each electrode are resiliently urged towards the workpiece and away from the main body of the electrode to define a clearance therebetween, the relative movement between the side members and the main body of the electrode being produced by causing the side members of each electrode to abut the side members of the other electrode or electrodes and thereby stop the advancement of the side members towards the workpiece while the main body of the electrode is caused to continue its movement towards the workpiece.

11. A method according to claim 9, wherein each electrode is moved along a path angled to the first direction so that the electrodes are moved with vector components in the first direction and in a direction angled to the path along which the electrode is moved.

12. An electrode assembly for an electro-chemical machining apparatus comprising an electrode for location adjacent a workpiece to be machined, said electrode being movable in a first direction relatively towards the workpiece, said electrode comprising a main body having a machining face shaped to a desired contour and two side members carried by the main body, the side members being constrained to move with the body and also relative to the body in a direction parallel with the first direction of movement of the electrode, the side members protruding ahead of the machining face of the main body at least during part of the movement of the electrode in the first direction and means for stopping the movement of the side members in the first direction while continuing the movement of the main body in the first direction for a predetermined distance.

13. A method of producing an article by electrochemically machining a workpiece, the method comprising the steps of:

supporting the workpiece for machining;

locating an electrode of an electrode assembly adjacent to the workpiece, said electrode being movable in a first direction relatively towards the workpiece, said electrode comprising a main body having a machining face shaped to a desired contour and two side members carried by the main body, the side members being constrained to move with the body and also relative to the body in a direction parallel with the first direction of movement of the electrode, the side members protruding ahead of the machining face of the main body;

maintaining a gap between the electrode and the workpiece;

supplying electrolyte to the gap between the electrode and the workpiece;

applying an electrical potential between the electrode and the workpiece thereby to electro-chemically machine the workpiece;

causing mutual relative approaching movement between the electrode and the workpiece to machine the workpiece;

and stopping the relative approaching movement of the side members while continuing the approaching movement of the main body of the electrode.

* * * * *